United States Patent [19]
Adair et al.

[11] Patent Number: 5,728,456
[45] Date of Patent: Mar. 17, 1998

[54] METHODS AND APPARATUS FOR PROVIDING AN ABSORBING, BROAD BAND, LOW BRIGHTNESS, ANTIREFLECTION COATING

[75] Inventors: Robert W. Adair; Paul M. Le Febvre, both of Santa Rosa; Eric W. Kurman, Healdsburg, all of Calif.

[73] Assignee: Optical Coating Laboratory, Inc., Santa Rosa, Calif.

[21] Appl. No.: 595,350

[22] Filed: Feb. 1, 1996

[51] Int. Cl.⁶ .................................................. G32B 9/04
[52] U.S. Cl. .................. 428/216; 428/426; 428/432; 428/698; 428/701; 428/702; 359/359; 359/361; 359/580; 359/589
[58] Field of Search ....................... 428/698, 426, 428/428, 432, 216, 336, 701, 702, 704; 359/359, 361, 580, 589

[56] References Cited

U.S. PATENT DOCUMENTS

| | | |
|---|---|---|
| 3,432,225 | 3/1969 | Rock . |
| 4,450,201 | 5/1984 | Brill et al. ............................. 428/698 |
| 5,085,926 | 2/1992 | Lida et al. ............................. 428/216 |
| 5,091,244 | 2/1992 | Biornard . |
| 5,170,291 | 12/1992 | Szczyrbowski, et al. . |
| 5,216,542 | 6/1993 | Szczyrbowski, et al. . |
| 5,270,858 | 12/1993 | Dickey . |
| 5,279,722 | 1/1994 | Szczyrbowski, et al. . |
| 5,464,683 | 11/1995 | Rudigier et al. ...................... 428/698 |

FOREIGN PATENT DOCUMENTS

| | | |
|---|---|---|
| 0 434 656 A3 | 6/1991 | European Pat. Off. . |
| 41 17 257 A1 | 12/1992 | Germany . |
| 93/04993 | 3/1993 | WIPO . |

OTHER PUBLICATIONS

Lockhart, L. and King, P., *Three–Layered Reflection–Reducing Coatings,* J. Opt. Soc. Am. 1947; 37:689–94.

Szczyrbowski, S.R., Szczyrbowski, K.H. Leybold, A.G., *Simple Antireflection Coatings for Cathode Ray Tube and Other Display Devices,* Hanau, West Germany.

Thetford, A., *A Method of Designing Three–Layer Antireflection Coatings,* Opt. Acta., 1969; 16(1): 37–43.

*Primary Examiner*—Archene Turner
*Attorney, Agent, or Firm*—Workman, Nydegger & Seeley

[57] ABSTRACT

The present invention relates to electrically-conductive, absorbing, contrast-enhancing antireflection coatings having excellent optical properties characterized by, specifically, a large bandwidth ratio, i.e., a ratio indicative of the range of wavelengths for which the reflectance value is less than 0.6%, and a small brightness value for the visible wavelengths. It has been surprisingly discovered that a simple, two-layer substrate coating consisting of only a first thin layer of a transparent material having a low refractive index and a second very thin layer of an absorbing, electrically conductive, transition metal oxynitride material provides high performance, electrically conductive, contrast-enhancing antireflection coatings having small brightness values and large bandwidth ratios. The present invention provides antireflection coatings having brightness values less than or equal to about 0.22, and preferably less than or equal to about 0.15. One important advantage of the present invention is that, due to the simplicity of the design and the suitability and efficiency of deposition of the materials in an in-line DC reactive magnetron sputtering process, the high performance, absorbing, electrically conductive, and contrast-enhancing antireflection coatings in accord with the present invention can be produced in a very cost-effective manner.

19 Claims, 6 Drawing Sheets

METHODS AND APPARATUS FOR PROVIDING AN ABSORBING, BROAD BAND, LOW BRIGHTNESS, ANTIREFLECTION COATING

BACKGROUND OF THE INVENTION

1. The Field of the Invention

The present invention is directed to methods and apparatus for improving the optical performance of antireflection coatings. In particular, the present invention relates to electrically-conductive, absorbing, contrast-enhancing antireflection coatings having excellent optical properties characterized by, specifically, a large bandwidth ratio and a small brightness value.

2. The Relevant Technology

Antireflection coatings are well known and have numerous applications including, for example, windows in buildings and vehicles, lenses in sunglasses, and visual display devices such as computer monitors, televisions, calculators, and clocks. Reflectance occurs at each interface of a material surface with another material surface, including air or another atmosphere, where the interfacing materials have different indices of refraction. In general, the greater the difference in indices of refraction, the greater the amount of reflectance.

Antireflection coatings are applied upon a surface of a substrate, usually a plastic or glass, to reduce the reflectance from that substrate surface. Antireflection coatings typically comprise an assembly of thin film layers of different coating materials applied to the substrate surface in selected sequence. The difference in the index of refraction of a coating material, or the effective index of refraction for a combination of material layers, and the index of refraction of the substrate material affects the amount of reflectance at the substrate surface. In addition to the difference in the indices of refraction of the coating and substrate materials, the amount of reflectance is affected by numerous other factors including the intensity, the wavelength, and the angle of the incident light. Other properties of the coating material or materials including the thickness, the optical constants, and the specularity, also affect the amount of reflectance.

In addition to reducing reflectance, antireflection coatings may also provide other useful functions such as electrical conductivity or contrast enhancement. Electrical conductivity is important in some applications such as cathode ray tube display devices to provide electrical grounding to prevent and/or discharge static build up. For some applications, including visual display devices and architectural applications, an antiglare effect is desired. In some of these applications, such as computer screens or televisions, enhancement of the contrast between the emitted light and reflected light is also desired. Although some applications, such as laser applications, require an antireflection effect at only one specific wavelength, for many applications, an antireflection effect over a broad band of wavelengths is desired. An ideal antireflection coating for a particular application would demonstrate zero reflectance over the wavelengths of interest. For many applications, an ideal reflectance would be zero over the entire visible band of wavelengths, i.e., from about 380–780 nm. In practice, this ideal is approached as closely as coating design and manufacturing technology permits.

Optical performance of an antireflection coating can be characterized by numerous parameters. Two characteristics indicative of optical performance are photopic brightness and bandwidth ratio. Photopic brightness is closely related to an average reflectance except that a weighting function is applied to the reflectance as a function of wavelength. The weighting function is sometimes referred to as a "photopic response" and is intended to simulate the sensitivity of human vision as a function of wavelength. Accordingly, wavelengths are weighted proportionally to how readily each is detected by human vision. The concise form for brightness is:

$$\text{Brightness} = \frac{\Sigma S(\lambda) V(\lambda) R(\lambda)}{\Sigma S(\lambda) V(\lambda)}$$

where $S(\lambda)$ is the source weighting function, i.e., source intensity as a function of wavelength, $V(\lambda)$ is the human vision response function, and $R(\lambda)$ is the reflectance of the substrate surface. In general, and particularly for contrast enhancement purposes, smaller brightness values are desired.

Bandwidth ratio is a measure of the distribution of the antireflection effect of a coating over the visible band of wavelengths. A graph of reflectance vs. wavelength for a simple antireflection coating often demonstrates a V-shaped curve having a specific wavelength at which reflectance is at a minimum and a fairly rapid increase in reflectance at wavelengths both above and below that wavelength where minimum reflectance occurs. Bandwidth ratio is calculated by determining the ratio of the longest wavelength at which the reflectance value ("R") is equal to a selected "absolute" value and the shortest wavelength at which the reflectance value is equal to the absolute value (where the reflectance value at wavelengths between that longest and shortest wavelength remains equal to or less than the absolute value). By common practice in the industry, the absolute reflectance value is considered to be 0.6% R. Accordingly, a coated substrate having a minimum reflectance of 0.2% at 550 nm, and a reflectance rising to 0.6% at 500 nm and again at 600 nm, would have a calculated bandwidth ratio of 600/500 or 1.2. In contrast, a coated substrate having a reflectance value below 0.6% over the entire range of wavelengths from 435 nm to 650 nm would have a larger bandwidth ratio of 650/435 or 1.494. In general, larger bandwidth ratios are desired. Thus, while the two measures, i.e., brightness value and bandwidth ratio are somewhat interrelated, a small brightness value and a large bandwidth ratio characterize a high performance antireflection coating.

The complexity of the design in view of the realities of manufacturing capabilities and costs must be considered. Optimal theoretical designs may be impossible or impractical to implement for various reasons. The overall cost is affected by factors such as the availability, chemical and mechanical stability, and durability of the coating materials and the applicability of various available production methods to the material. Increasing complexity of the coating design generally increases the production cost. In particular, the number of different materials used, the total number of coating layers, and the thickness of the layers will impact the cost. Thus, although high optical performance has been attained with relatively complex multi-layer designs, these multi-layered antireflection coatings generally have relatively high production costs.

A simple antireflection coating may comprise a single layer of a material having a refractive index intermediate between the refractive indices of the medium through which reflection will occur and the interfacing substrate material. The index of refraction value varies with wavelength. Accordingly, for purposes of this discussion, all index of refraction values are for a wavelength of 510 nm, unless otherwise specified herein. For example, if the medium is air, which has an index of refraction ("n") of 1.0, and the substrate is glass, which has an n=1.52, the coating could be MgF$_2$, which has an n=1.38. Single layer antireflection coatings generally have relatively poor optical performance, however, in that the reflectance value does not closely approach zero except for certain substrate/coating combinations and, even then, such a near-zero reflectance will occur only at one wavelength. The calculated brightness value for a single-layer of MgF$_2$ 92.4 nm thick applied to a glass substrate is 1.34%. The bandwidth ratio cannot be calculated by the standard method using 0.6% R as the absolute value because the reflectance value at all wavelengths is greater than this value. Thus, it will be appreciated that single-layer antireflection coatings, while simple, do not achieve high optical performance.

More commonly, antireflection coatings comprise multiple layers of at least two different materials applied to a substrate surface. The innermost layer of the antireflection coating, i.e., the layer positioned adjacent the substrate surface, typically comprises a material having a high index of refraction, i.e., preferably greater than 1.8 and, most preferably, greater than 2. Suitable materials are well known in the art and include various metal oxides such as TiO$_2$, ZrO$_2$, Nb$_2$O$_5$, Ta$_2$O$_5$, ZnO$_2$, In$_2$O$_3$, SnO$_2$, and HfO$_2$ as well as alloys of these metal oxides. The outermost layer of the antireflection coating, i.e., the layer positioned farthest from the substrate surface, typically comprises a material having a low index of refraction. Conventional wisdom holds that the best antireflection coating uses the material with the lowest refractive index available in this outermost layer. Accordingly, materials having indices of refraction of less than about 1.65 are preferred. Suitable materials are well known in the art and include MgF$_2$ and SiO$_2$.

The materials used in antireflection coatings are typically transparent. Conventional antireflection coatings are constructed as a stack of layers of appropriate films of transparent materials having alternating high and low indices of refraction. As described above, two-layer antireflection coatings typically achieve a near-zero reflectance value at one wavelength and maintain low reflectance values over a relatively narrow bandwidth of surrounding wavelengths: Because the graph of wavelength vs. reflectance values resembles a "V," these designs are sometimes referred to as "V-coats." In addition to selecting suitable materials, the thickness of the layers is a critical factor affecting the optical performance of these V-coat designs.

For example, consider the difference in brightness and bandwidth ratio for alternative two-layer antireflection coating designs, each comprising a first, outermost, layer of SiO$_2$, n=1.48, and a second, innermost, layer of Nb$_2$O$_5$, n=2.39. In one design, the SiO$_2$ layer is much thicker than the Nb$_2$O$_5$ layer and, in the other design, the SiO$_2$ layer is thinner than the Nb$_2$O$_5$ layer. When the SiO$_2$ layer is approximately 116 nm thick and the Nb$_2$O$_5$ layer is approximately 18 nm thick, the brightness value is approximately 0.84% and the bandwidth ratio is about 1.16. In contrast, when the SiO$_2$ layer is approximately 60 nm thick and the Nb$_2$O$_5$ layer is approximately 96 nm thick, the brightness value increases to approximately 2.99% while the bandwidth ratio drops to about 1.10.

Three-layer antireflection coatings are also known. See, e.g., Lockhart, L. and King, P., *Three-Layered Reflection-Reducing Coatings*, J. Opt. Soc. Am., 1947; 37: 689–94; Thetford, A., *A Method of Designing Three-Layer Antireflection Coatings*, Opt. Acta., 1969: 11: 159–70. A three-layer antireflection coating wherein the first layer is farthest from the substrate and the third layer is nearest the substrate may utilize three different materials as follows: an outermost, or first, layer of material having a low index of refraction, a middle, or second, layer of material having a high index of refraction, and an innermost, or third, layer of material having an index of refraction intermediate between the indices of refraction of the middle layer and the substrate. A characteristic of many three-layer coating designs is the presence of two minima in the graph of the wavelength vs. reflectance values. Thus, the graph of wavelength vs. reflectance values resembles a "W" such that these designs are sometimes referred to as "W-coats."

An example of such a W-coat design comprises a first layer of SiO$_2$ 86 nm thick, a second layer of Nb$_2$O$_5$ 100 nm thick, and a third layer, 74 nm thick, of a material having an intermediate index of refraction of 1.8. The overall thickness of the three layer coating is 260 nm. Assuming a silicon oxynitride material for the third layer, the calculated brightness value for this theoretical design is 0.12% while the calculated bandwidth ratio is 1.64. Thus, the theoretical three-layer design incorporating three different materials offers significantly improved optical performance over the single and two-layer designs but at the cost of increased complexity and production cost.

To avoid the use of three different materials, alternative designs comprising four layers which incorporate only two different materials have been developed. See, e.g., U.S. Pat. No. 3,432,225 issued to Rock. A combination of a layer having a low index of refraction and a layer having a high index of refraction will, over a certain wavelength range, behave in a manner similar to a layer having an intermediate index of refraction. Thus, in the above-described three-layer design, the third layer of material desired to have an index of refraction intermediate between the second layer and the substrate is simulated with two layers of materials in the four-layer design, one layer of material having a low index of refraction and one layer of material having a high index of refraction. To simplify the design, the material having the low index of refraction can be the same low-index material used in the first layer and the material having the high index of refraction may be the same high-index material used in the second layer.

For example, a conventional four-layer antireflection coating could comprise two layers of the high refractive index material, Nb$_2$O$_5$, and two layers of the low refractive index material, SiO$_2$, arranged as follows: an outermost, or first, layer of SiO$_2$ that is 92 nm thick, a next adjacent, or second, layer of Nb$_2$O$_5$ that is 112 nm thick, another next adjacent, or third, layer of SiO$_2$ that is 33 nm thick, and an innermost, or fourth, layer, adjacent to the substrate, of Nb$_2$O$_5$ that is 15 nm thick. The overall thickness of the four layers is 252 nm. The calculated brightness value for this design is 0.16% while the calculated bandwidth ratio is 1.44. The four-layer design, thus, demonstrates very good optical properties.

Because the four-layer design incorporates only two different materials, it is slightly less complex than the three-layer design, however, the optical properties of the four-layer design are not quite as good as the three-layer design. In addition, the four-layer design incorporating only two different materials has been shown to be very sensitive to slight variations in the thickness of the layers. For example, a tolerance plot made by randomly varying layer thicknesses about the nominal with a standard deviation of 2% demonstrates that the brightness value correspondingly varies from as low as about 0.12% to about 0.29%.

Concerns relating to production cost, available manufacturing technology, and customer or market requirements have resulted in the development of numerous more complex antireflection coating designs. These designs may have four or more layers and incorporate three or more different materials. Although high performance has been achieved with many of these designs, the performance increases have been at the cost of an increase in the number of coating layers and/or the number of different materials required. In addition, in order to incorporate the feature of electrical conductivity, some designs utilize transparent conducting oxide materials, thus further increasing the complexity and manufacturing cost.

All of the above-described antireflection coatings used transparent materials. It is also known to use absorbing materials, such as metals, in antireflection coatings. For many applications, such as heat reduction through windows, eye protection in sunglasses, or contrast enhancement in video display devices, some degree of attenuation of the light passing through the substrate from either or both directions, is also desired. Attenuation may be achieved by modifying the substrate as, for example, by selecting an absorbing material for the substrate or by tinting or dying the substrate material. Alternatively, or additionally, an antireflection coating may provide light attenuation as, for example, by incorporating a thin layer of an absorbing metal material having relatively low reflectivity, such as chromium or molybdenum, into the coating. Antireflection coatings incorporating thin layers of metals having relatively high reflectivity such as silver and gold have also been developed.

The optical properties of metals and light absorbing materials are generally specified in terms of the complex refractive index: n−ik. The values of n (the real part of the complex index) and k (the imaginary part of the complex index) are referred to as the optical constants of the material. These values may be different for different crystalline and physical forms of a material. In contrast, the index of refraction for non-absorbing, i.e., transparent, materials is conventionally described with the n value because the finite absorption, i.e., the k value, for these materials is so close to zero as to be insignificant. Another difference between absorbing and non-absorbing materials applied as a coating upon a surface of a substrate is that, for absorbing materials, the reflectance is not the same when measured from either side, i.e., the coated side and the opposite, uncoated side of the substrate.

Exemplary absorbing antireflection coatings include those disclosed in U.S. Pat. Nos. 5,091,244 and 5,216,542. Transition metals known to form nitrides including titanium, zirconium, hafnium, vanadium, tantalum, niobium, and chromium are disclosed as useful absorbing materials. A preferred absorbing material is titanium nitride. For example, a four-layer absorbing antireflection coating has the following arrangement: an outermost, or first, layer of $SiO_2$ that is about 82 nm thick, a next adjacent, or second, layer of TiN that is about 7 nm thick, another next adjacent, or third, layer of $TiO_2$ that is about 30 nm thick, and an innermost, or fourth, layer, adjacent to the substrate, of TiN that is about 20 nm thick. The overall thickness of the four layers is, thus, about 139 nm. The calculated brightness value for this design at a wavelength is 0.102% while the calculated bandwidth ratio is 1.60. The calculated transmission value for this embodiment was reported to be 48%. Reduction of transmission values was accomplished by increasing the number and/or the total thickness of the TiN layers.

Accordingly, it is apparent that there are numerous antireflection coating designs. High performance coatings, however, generally comprise three or more layers and two or more different materials.

It would be an advancement to provide improved high performance, electrically-conductive, contrast-enhancing, absorbing antireflection coatings which are simple and cost effective to produce.

SUMMARY AND OBJECTS OF THE INVENTION

It is a primary object of the present invention to provide high performance absorbing antireflection coatings.

It is another object of the present invention to provide such antireflection coatings which are also electrically conductive.

Yet another object of the present invention is to provide high performance, absorbing, electrically conductive antireflection coatings which are useful for contrast enhancement.

A further object of the present invention is to provide such antireflection coatings which are simple and cost effective to produce.

These and other objects and advantages of the invention will be better understood by reference to the detailed description, or will be appreciated by the practice of the invention.

To achieve the foregoing objects, and in accordance with the invention as embodied and broadly described herein, the present invention relates to electrically-conductive, absorbing, contrast-enhancing antireflection coatings having excellent optical properties characterized by, specifically, a large bandwidth ratio, i.e., a ratio indicative of the range of wavelengths for which the reflectance value is less than 0.6%, and a small brightness value for the visible wavelengths. Moreover, the antireflection coatings in accord with the present invention are simple and relatively cost-effective to produce.

The present invention is directed particularly to antireflection coatings applied to a front surface of a substrate, i.e., the surface facing an observer, for the purpose of reducing reflectance from that surface. It has been surprisingly discovered that a simple, two-layer substrate coating consisting of only an outermost thin layer of a transparent material having a low refractive index and an innermost very thin layer of an absorbing, electrically conductive, transition metal oxynitride material provides high performance, electrically conductive, contrast-enhancing antireflection coatings having small brightness values and large bandwidth ratios.

The outermost layer of a presently preferred two-layer antireflection coating of the present invention comprises a transparent material having a low refractive index, preferably between about 1.3 and 2.0. Suitable transparent materials are well known in the art. A presently preferred material is $SiO_2$ in a thickness of between about 80 and about 94 nm. The innermost layer of a presently preferred two-layer antireflection coating of the present invention comprises the transition metal titanium combined with non-stoichiometric quantities of both nitrogen and oxygen. In particular, for each titanium atom, the nitrogen composition range is preferably about 0.8 to about 1.2 and the oxygen composition range is preferably about 0.3 to about 0.8. Thicknesses of between 9 and 15 nm are preferred. It will be appreciated that other transition metals, or mixtures of transition metals, that can form oxynitrides could also be used.

The present invention provides antireflection coatings having brightness values less than or equal to about 0.22, and preferably less than or equal to about 0.15. One important advantage of the present invention is that, due to the simplicity of the design and the suitability and efficiency of deposition of the materials in an in-line DC reactive magnetron sputtering process, the high performance, absorbing, electrically conductive, and contrast-enhancing antireflection coatings in accord with the present invention can be produced in a very cost-effective manner.

BRIEF DESCRIPTION OF THE DRAWINGS

In order that the manner in which the above-recited and other advantages and objects of the invention are obtained, a more particular description of the invention briefly described above will be rendered by reference to specific embodiments thereof illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
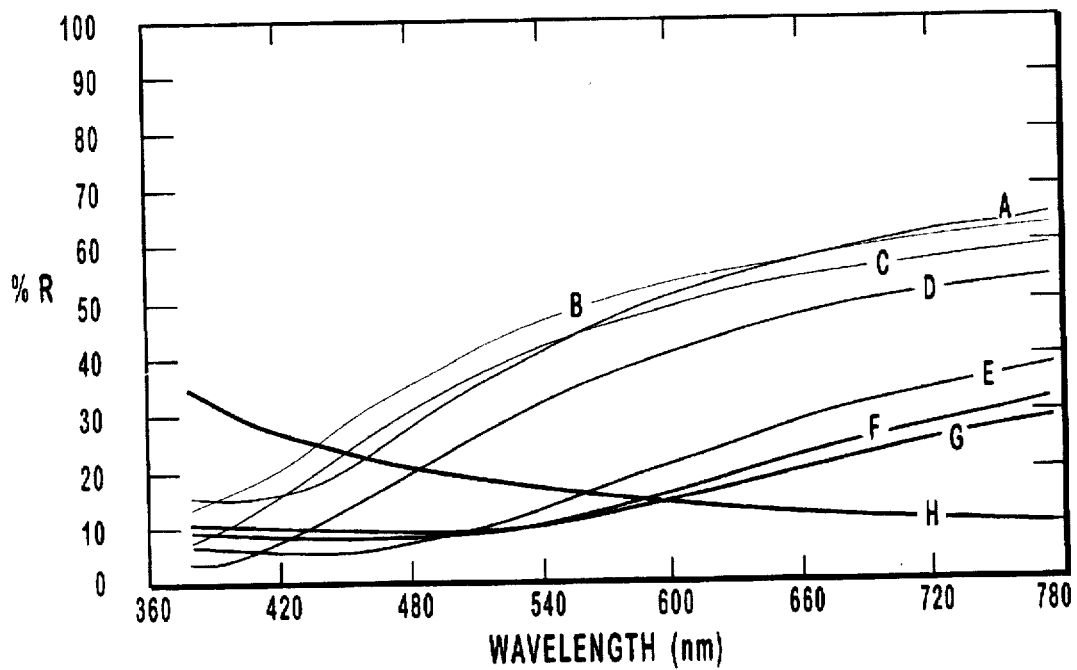
FIG. 1 is a graph of reflectance (reflection percent) vs. wavelength (nm) curves for titanium nitride, oxynitride, and oxide films applied upon a glass substrate.

The present invention is directed to methods and apparatus for improving the optical performance of antireflection coatings. In particular, the present invention relates to electrically-conductive, absorbing, contrast-enhancing antireflection coatings having excellent optical properties characterized by, specifically, a large bandwidth ratio, i.e., a ratio indicative of the range of wavelengths for which the reflectance value is less than 0.6%, and a small brightness value for the visible wavelengths. Moreover, antireflection coatings in accord with the present invention are simple and relatively cost-effective to produce.

The present invention is directed particularly to antireflection coatings applied to a front surface of a substrate, i.e., the surface facing an observer, for the purpose of reducing reflectance from that surface. Simple, two-layer, transparent antireflection coatings are known in the art. These coatings, known as V-coats, typically comprise an outermost, or first, transparent layer of material having a low index of refraction and an innermost, or second, transparent layer of material having a high index of refraction, applied upon a front surface of a substrate such as plastic or glass. As reviewed in the background section, the optical performance of these simple V-coat designs has been improved upon with the addition of more layers and, usually, additional materials to the coating designs. Also, as reviewed in the background section, the use of absorbing materials, including transition metal nitrides, in antireflection coatings is known. Again, high performance is generally achieved with four or more layers of different materials.

The ideal antireflection coating will demonstrate zero reflectance over the wavelength range of interest for a particular application. In actual practice, ideal performance is never achieved but is approached as closely as possible given the constraints of physical materials, coating capabilities, cost or other optical requirements such as a particular desired transmission value. Optically absorbing materials offer design advantages over transparent materials for applications where high transmission is either not required or is not desired.

It is well known that, because of the strong tendency of oxygen to displace nitrogen, the production of transition metal nitrides must be conducted in an oxygen-deficient atmosphere. Indeed, in the presence of a sufficient quantity of oxygen, transparent $TiO_2$ will be produced rather than absorbing TiN. A typical production method for providing a layer of TiN is DC reactive magnetron sputtering of a Ti target in an argon/nitrogen reaction mixture. Although it is not possible to completely exclude oxygen from the reaction mixture, the nominal quantities of oxygen which may be present are considered insignificant contaminants. See, e.g., Edlou, S. M., Simons, J. C., Al-Jumaily, G. A, Raouf, N. A., *Optical and electrical properties of reactively sputtered TiN, ZrN, and HfN thin films*, Rancourt, J. D. (ed.), Optical Thin Films IV: New Developments, SPIE Proceedings, 1994; 2262:96–106.

Contrary to conventional knowledge, it has been discovered that the incorporation of non-stoichiometric quantities of oxygen into a transition metal nitride provides an absorbing material which is surprisingly effective for use in an antireflection coating. In particular, it has been surprisingly discovered that a simple, two-layer substrate coating consisting of only an outermost, or first, thin layer of a transparent material having a low refractive index and an innermost, or second, very thin layer of an absorbing, electrically conductive, transition metal oxynitride material provides high performance, electrically conductive, contrast-enhancing antireflection coatings having small brightness values and large bandwidth ratios.

FIG. 1 illustrates reflectance (% R) vs. wavelength (nm) curves for titanium nitride, titanium oxynitride, and titanium oxide films applied upon a glass substrate in a DC reactive magnetron sputter device. A titanium target and power setting of 4.0 kW was used, the linespeed was 2.5 cm/min, and the pressure was 1.62 mTorr. The target length was 18 inches. The initial reaction mixture contained 70 standard cubic centimeters per minute (sccm) argon and 20 sccm nitrogen and no oxygen. Oxygen was introduced into the reaction mixture in amounts varying from 1 to 30 sccm. The curves referenced with the letters A–H represent the films produced with the following oxygen flows: curve A, oxygen flow 0 sccm; curve B, oxygen flow approximately 1 sccm; curve C, oxygen flow approximately 3 sccm; curve D, oxygen flow approximately 5 sccm; curve E, oxygen flow approximately 10 sccm; curve F, oxygen flow approximately 15 sccm; curve G, oxygen flow approximately 20 sccm; and curve H, oxygen flow approximately 30 sccm. Curve H illustrates that, at an oxygen flow of approximately 30 sccm, $TiO_2$ was produced. FIG. 1 demonstrates that reflectance was very sensitive to changes in the oxygen content.

Table 1 lists estimated stoichiometry for the nitrogen and oxygen content of titanium oxynitride thin films produced with varying oxygen:nitrogen gas ratios within the sputtering reaction mixture. The sputtering system had an air leak at an estimated rate of 1 sccm. All of the coatings were deposited using an 18 inch titanium target and power setting of 2.0 kW. The linespeed was 10 cm/min, and the pressure was between 3.06 and 3.14 mTorr. The reaction mixture contained 150 sccm argon and 40 sccm nitrogen and oxygen ($O_2$) varying from 0 to 5.0 sccm.

TABLE 1

| $O_2$(sccm) | N fraction | O fraction | O:N ratio |
|---|---|---|---|
| 0.0 | 1.0 | 0.2 | 0.000 |
| 1.0 | 1.0 | 0.3 | 0.025 |
| 3.0 | 0.9 | 0.9 | 0.075 |
| 5.0 | 0.6 | 1.1 | 0.125 |

Figure 2:
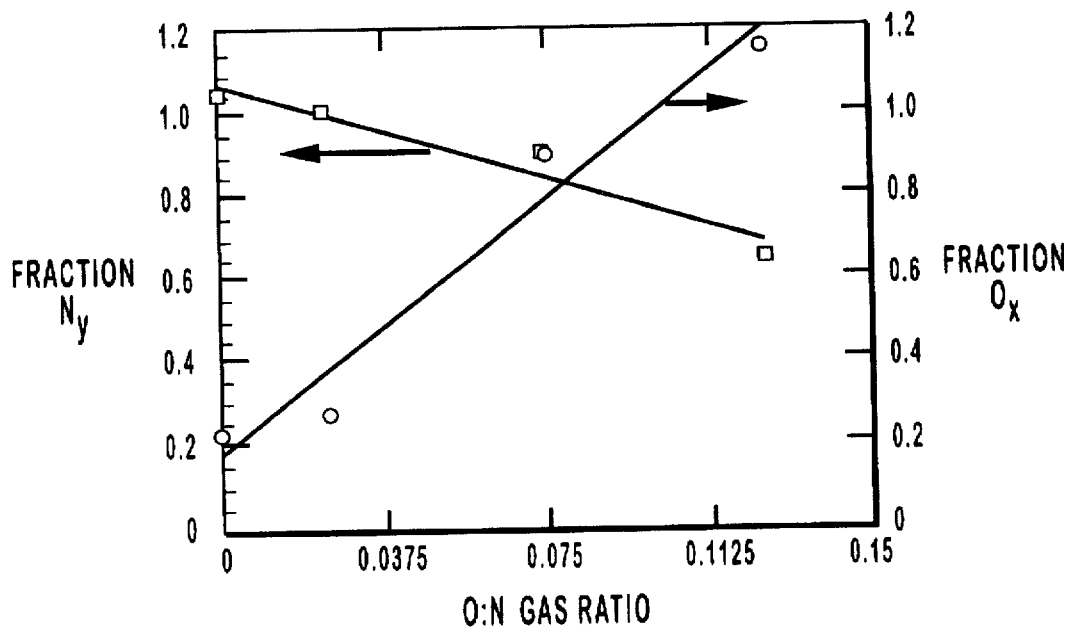
FIG. 2 is a graphic representation of the estimated fractions of nitrogen and fractions of oxygen in films plotted against the oxygen:nitrogen gas ratio in the sputtering reaction mixture.

FIG. 2 is a graphic representation of the estimated fractions of nitrogen (N) and fractions of oxygen (O) plotted against the oxygen:nitrogen gas ratio. It is seen that, in the described system, an estimated stoichiometric range of nitrogen of about 0.8 to about 1.2 and an estimated stoichiometric range for oxygen of about 0.3 to about 0.8 are achieved at rates of $O_2$ flow greater than about 1.0 sccm to slightly less than about 3.0 sccm. It will be appreciated that these oxygen flows are specific for the system described. Adjustments will occur as the system parameters change.

The outermost layer of a presently preferred two-layer antireflection coating of the present invention comprises a transparent material having a low refractive index, preferably between about 1.3 and 2.0. The index of refraction value varies with wavelength. Accordingly, for purposes of this discussion, all index of refraction values are for a wavelength of 510 nm, unless otherwise specified herein. Suitable transparent materials having such appropriate refractive indices are well known in the art and include $MgF_2$, $SiO_2$, other compositions consisting of silicon and oxygen with fluorine ($SiO_xF_y$), silicon and oxygen with nitrogen ($SiO_xN_y$), and silicon and oxygen with fluorine and nitrogen ($SiO_xN_yF_z$), PTFE, $Al_2O_3$, $Y_2O_3$, $CeF_3$, and $ThF_4$. A presently preferred material is $SiO_2$ in a thickness of between about 80 and about 94 nm. The index of the outermost, or first, transparent layer may range from 1.3 to 2.0 depending on the optical properties of the innermost, or second, layer. In practice, the lower the index of refraction of the first layer, the wider the bandwidth ratio and the lower the overall brightness value. It will be appreciated by those of skill in the art that the choice of index of refraction for the first layer allows some tunability to the overall transmission value of the design.

The innermost, or second, layer of the two-layer antireflection coating of the present invention comprises a transition metal, such as titanium, combined with non-stoichiometric quantities of both nitrogen and oxygen. A general formula for the material therefore is MOxNy, where M=a suitable transition metal, O=oxygen, and N=nitrogen. A presently preferred transition metal is titanium. In particular, for each titanium atom, the nitrogen composition range is preferably about 0.8 to about 1.2 and the oxygen composition range is preferably about 0.3 to about 0.8. Because it is known that transmission values ranging from 20% to 80% can typically be obtained with thicknesses of an absorbing material in the range of 10 to 20 nm, 12 nm was initially selected for the thickness of the absorbing layer. Thicknesses of between 9 and 15 nm are preferred. It will be appreciated that other transition metals known to form oxynitrides including zirconium, hafnium, vanadium, tantalum, niobium, and chromium, or mixtures of transition metals could also be used. In this manner, antireflection coatings having different levels of transmission and different levels of sheet resistance could be produced. It will be appreciated that the stoichiometries of oxygen and nitrogen for transition metals other than titanium may be different than those described above for titanium.

With respect to V-coat designs, the optical transmission of the V-coat design, at a specified wavelength, may be altered between 40% and 100% by replacing the high index dielectric layer with a layer containing one or more sublayers of an absorbing material in accord with the present invention. The bandwidth ratio of the V-coat design may be increased by replacing the high index dielectric layer with a layer containing one or more sublayers of an absorbing material in accord with the present invention. The brightness value of the V-coat design may be reduced by replacing the high index dielectric layer with a layer containing one or more sublayers of an absorbing material in accord with the present invention.

The present invention provides antireflection coatings having brightness values less than or equal to about 0.22, and preferably less than or equal to about 0.15. Accordingly, the brightness values and bandwidth ratios of the inventive antireflection coatings are superior to known two-layer transparent antireflection coating designs and are comparable or superior to more complex coating designs typically containing at least four layers of materials including at least one absorbing material.

One important advantage of the present invention is that, due to the simplicity of the design and the suitability and efficiency of deposition of the materials in an in-line DC reactive magnetron sputtering process, the high performance, absorbing, electrically conductive, and contrast-enhancing antireflection coatings in accord with the present invention can be produced in a very cost-effective manner. This aspect of the present invention will be discussed in detail following the description of exemplary embodiments.

EXAMPLE 1

Figure 3:
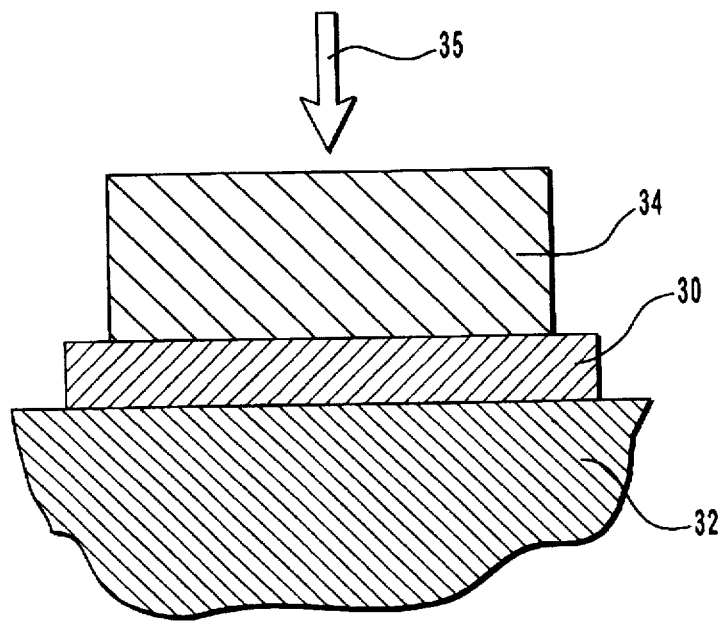
FIG. 3 illustrates a preferred embodiment of the present invention.

FIG. 3 illustrates a high performance, electrically conductive, contrast-enhancing antireflection coating in accord with the present invention comprising an absorbing layer 30 of titanium oxynitride about 12 nm thick applied upon a surface of a glass substrate 32 and a transparent layer 34 of $SiO_2$ about 92 nm thick applied upon the absorbing layer.

This coating was produced on a BOC in-line sputter deposition system using DC reactive magnetron sputtering by means of CMAG rotatable cathodes. The coater was operated as is customary in the industry: a glass substrate was used which had previously been cleaned by passage through a flat plate washer. The glass substrate was introduced into the coating line by means of a vacuum load lock which was evacuated to a desired pressure. The glass substrate was then transported into the coating line conveyor and placed in sequence with other glass substrates which had previously been introduced into the coating line. The particular substrate of interest was followed by additional similar substrates also in sequence. During the time period covered by this account, the various deposition parameters of the in-line coating system were varied in order to optimize the properties of the deposited multilayer optical coating.

The $SiO_2$ layer was deposited under the following conditions: Admitting argon gas under control of argon mass flow and oxygen gas under control of total pressure. Silicon metal was supplied from a sputter target consisting of plasma-sprayed silicon-aluminum composite supported on a stainless steel mandrel; the assembly was mounted on a BOC CMAG rotatable DC magnetron cathode. Multiple silicon deposition sources were used and the total deposition power was 96 kW at a nominal linespeed.

The titanium oxynitride layer was deposited under the following conditions: Admitting argon gas under control of argon partial pressure, nitrogen gas under control of nitrogen partial pressure, and oxygen gas under control of mass flow. Argon gas partial pressure was 2.0 mTorr and the corresponding argon mass flow was 282 sccm. Nitrogen partial pressure was 0.55 mTorr and the corresponding nitrogen mass flow was 163 sccm. Oxygen mass flow was 14 sccm. The ratio of oxygen to nitrogen mass flow was thus 0.086. Titanium metal was supplied from a sputter target consisting of a solid tube of commercial purity (C.P.) titanium mounted on a BOC CMAG rotatable DC magnetron cathode. The titanium target was 47.24 inches in length. The deposition power of the titanium oxynitride layer was 34 kW at a deposition linespeed of 3.8 times the nominal coater linespeed.

On the basis of oxygen detected by residual gas analysis during the production process and on data from Rutherford Backscattering Scans performed on essentially identically produced titanium oxynitride layers, the stoichiometrics of the titanium oxynitride in this example is estimated to be approximately Ti=1; N=1.0; and O=0.4.

Figure 4:
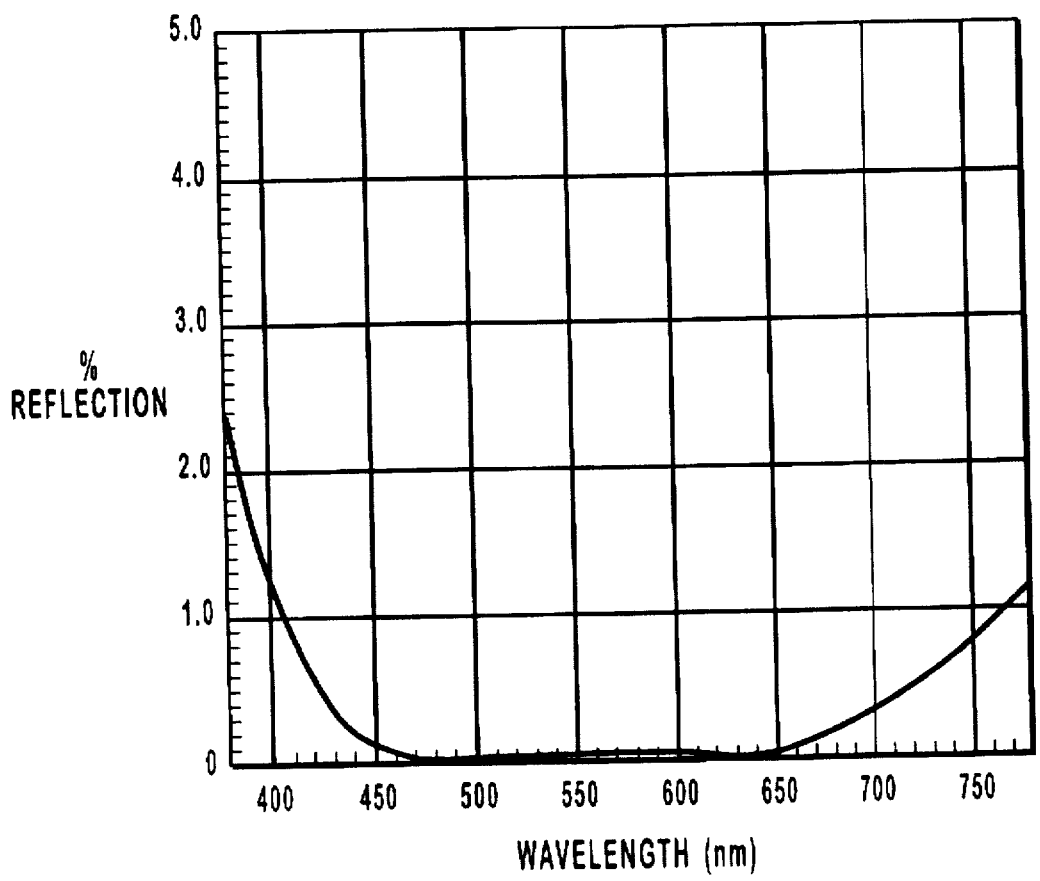
FIG. 4 is a graph of reflectance (reflection percent) vs. wavelength (nm) for the preferred embodiment of FIG. 2.

FIG. 4 is a graph of wavelength vs. reflectance values (reflection percent) for this coating measured from the direction of arrow 35 in FIG. 3. The reflectance is less than 0.6% for wavelengths between about 421 nm and 714 nm. Thus, the bandwidth ratio is approximately 1.70. The brightness value is 0.04%. The electrical conductivity was measured at 120 Ω/square.

EXAMPLE 2

A high performance, electrically conductive, contrast-enhancing antireflection coating in accord with the present invention comprising an absorbing layer of titanium oxynitride about 12 nm thick applied upon a surface of a glass substrate and a transparent layer of SiO$_2$ about 92 nm thick applied upon the absorbing layer.

This coating was produced on a BOC in-line sputter deposition system using DC reactive magnetron sputtering substantially as described for Example 1.

The SiO$_2$ layer was deposited under the following conditions: Admitting argon gas under control of argon mass flow and oxygen gas under control of total pressure. Silicon metal was supplied from a sputter target consisting of plasma-sprayed silicon-aluminum composite supported on a stainless steel mandrel; the assembly was mounted on a BOG CMAG rotatable DC magnetron cathode. Multiple silicon deposition sources were used and the total deposition power was 110 kW at a nominal linespeed.

The titanium oxynitride layer was deposited under the following conditions: Admitting argon gas under control of argon partial pressure and nitrogen gas under control of nitrogen partial pressure. Oxygen gas was not explicitly supplied to the titanium oxynitride deposition process so no mass flow number is established, however, due to machine configuration, significant oxygen "crosstalk" occurred from an adjacent oxide processing zone (used for deposition of the SiO$_2$ layer). A residual gas analyzer (RGA) quadrupole mass spectrometer connected to the coating chamber at a point intermediate between the SiO$_2$ and titanium oxynitride deposition zones showed that the partial pressure of oxygen was about one-third that of nitrogen. Argon gas partial pressure was 1.7 mTorr and the corresponding argon mass flow was 237 sccm. Nitrogen partial pressure was 0.55 0.11 mTorr and the corresponding nitrogen mass flow was 26 sccm. No oxygen mass flow was established, however, based on the above information and other machine characteristics including measurements of zone-m-zone pressure isolation, the ratio of oxygen to nitrogen partial pressure is estimated to be approximately 0.05 in the deposition zone.

Titanium metal was supplied from a sputter target consisting of a solid tube of commercial purity (C.P.) titanium mounted on a BOC CMAG rotatable DC magnetron cathode. The titanium target was 47.24 inches in length. The deposition power of the titanium oxynitride layer was 7.0 kW at a deposition linespeed equal to the nominal coater linespeed used for the SiO$_2$ layer.

Figure 5:
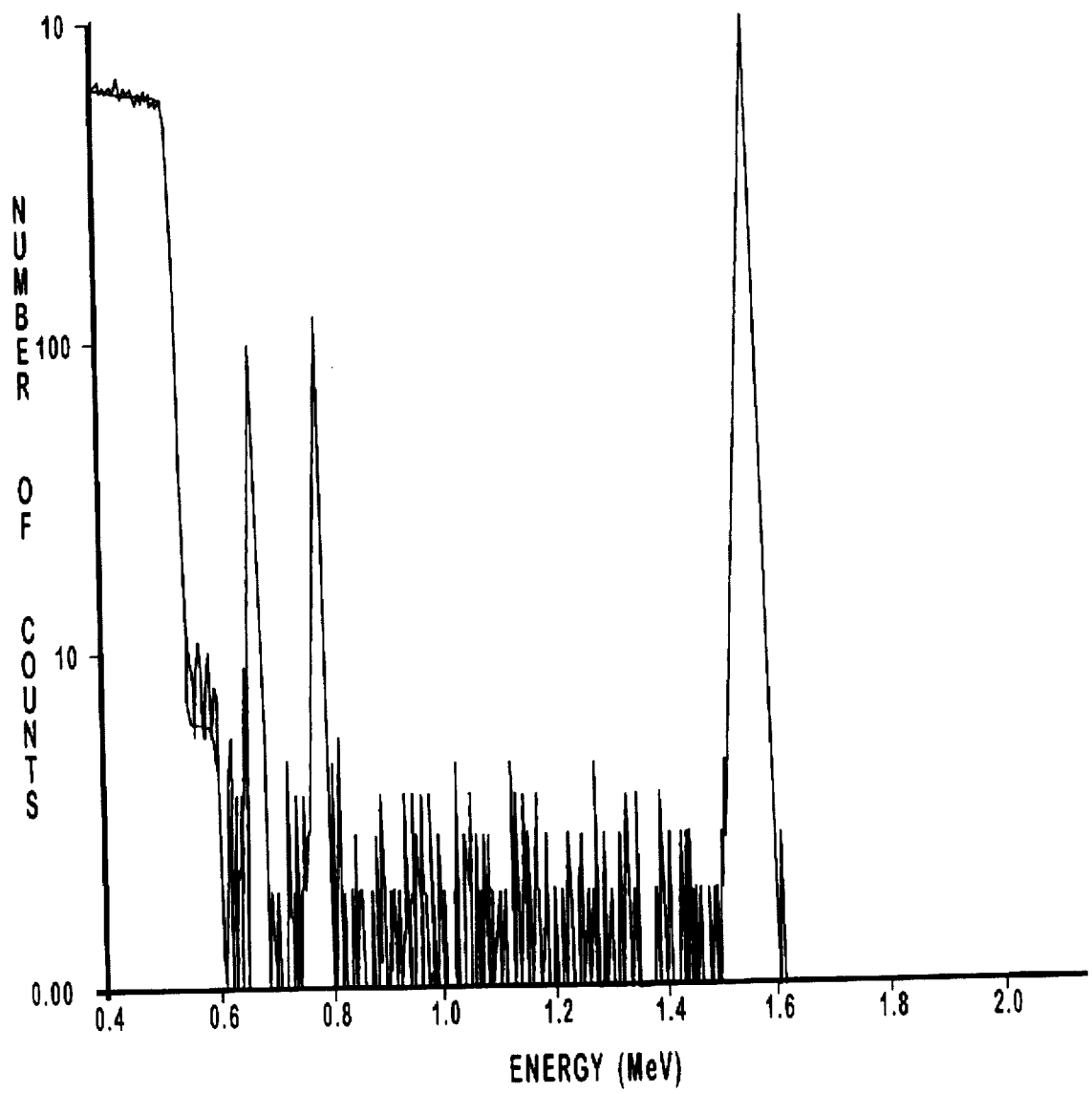
FIG. 5 depicts a Rutherford Backscattering Scan performed on a portion of a titanium oxynitride coating.
Figure 6:
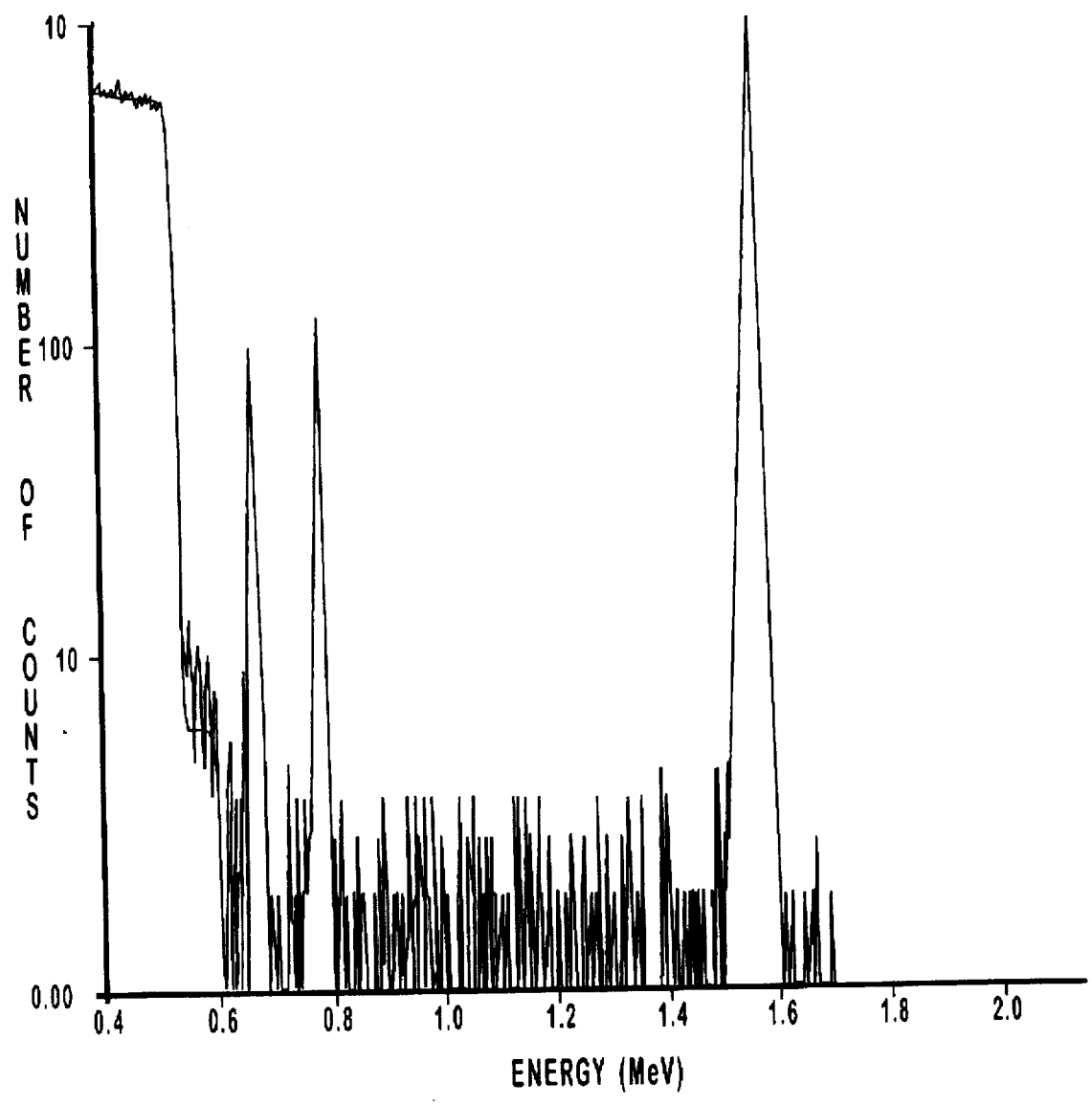
FIG. 6 depicts a Rutherford Backscattering Scan performed on a portion of a titanium oxynitride coating.
Figure 7:
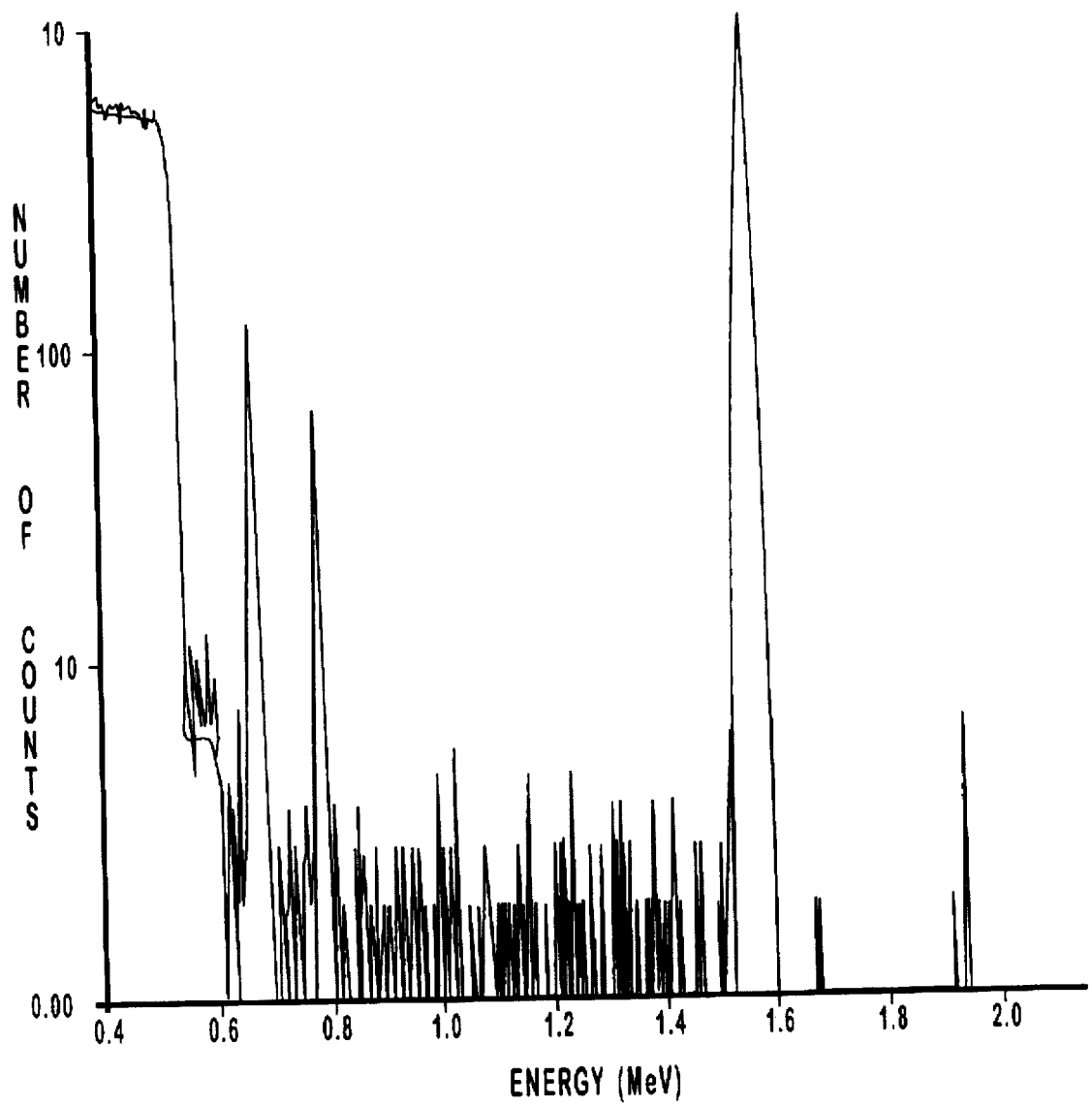
FIG. 7 depicts a Rutherford Backscattering Scan performed on a portion of a titanium oxynitride coating.

FIGS. 5, 6, and 7 are Rutherford Backscattering Scans performed on various positions across the transverse direction of the substrate, respectively, the pump side edge, the operator side edge, and center position, of a titanium oxynitride layer produced with identical processing parameters to the coating just described except on a carbon rather than a glass substrate. The nitrogen peak appears at approximately 0.65 MeV, the oxygen peak at approximately 0.77 MeV, and the titanium at approximately 1.55 MeV. FIG. 5 demonstrates the following approximate stoichiometries: Ti=1; N=0.9; and O=0.8. Similarly, FIG. 6 demonstrates the following approximate stoichiometries: Ti=1; N=0.9; and O=0.8. FIG. 7 demonstrates the following approximate stoichiometries: Ti=1; N=1.0; and O=0.4.

Figure 8:
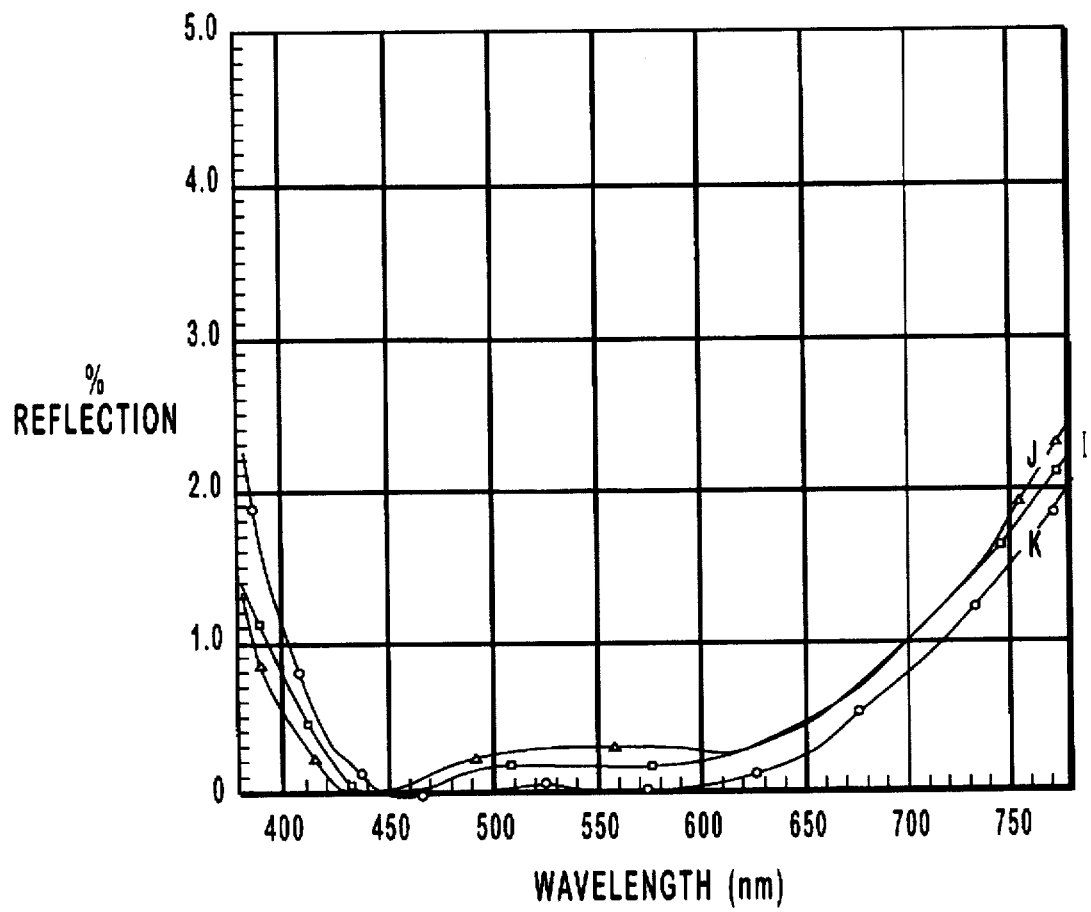
FIG. 8 is a graph of reflectance (reflection percent) vs. wavelength (nm) for a preferred embodiment of the present invention.

FIG. 8 is a graph of wavelength vs. reflectance values (reflection percent) for this coating measured from the direction of arrow 35 in FIG. 3. The three curves, referenced as I, J, and K, are measurements taken from the pump side edge, operator side edge, and center position of the coated substrate, respectively. The bandwidth ratios were approximately, 1.6, 1.7, and 1.7, for the pump side edge, operator side edge, and center position, respectively. The brightness value for the center position of the film was about 0.09%. The brightness values for the edge portions, however, both exceeded 0.22%. The electrical conductivity was measured at 200 Ω/square.

From the above results, it was determined that stoichiometries of nitrogen about 1.0 achieves the desired high performance. Due to variability in the sensitivity of the measurements with the available detection equipment, a range of 0.8 to 1.2 is selected to account for a reasonable standard deviation. Similarly, it was determined that stoichiometries of oxygen between about 0.4 and less than about 0.8 achieve the desired high performance. A desired range of 0.3 to 0.8 is therefore selected.

In describing the present invention only layers which are optically functional, i.e., necessary to achieve the desired optical performance, have been described. It is well known in the art to use additional very thin layers of other materials for purposes of improving the mechanical stability of an antireflection coating. These additional layers are commonly referred to as adhesion layers and may include materials such as silicon nitrides, titanium oxides, Cr, and Cr oxides, SiO$_2$, and Al$_2$O$_3$. The thickness and material is selected to avoid significant optical effect, however, it is well known to compensate for any such effect by adjusting one or more of the other layers of material. The addition of such adhesion layers is possible without departing from the spirit and scope of the present invention.

In any of the above-described embodiments, either the transparent layer or the absorbing layer, or both, may be replaced with a combination of thinner layers, i.e., sublayers, having about the same optical thickness but different refractive indices. This technique is well known in the art as a way of simulating a layer of material having a specific refractive index. The technique may be used when a material having some desired value of refractive index does not exist, is not easily deposited, or does not have suitable physical properties. Such modifications are possible without departing from the spirit and scope of the present invention.

In addition to optical performance, a very important factor in the production of antireflection thin film coating assemblies is the overall production cost. Thin films may be deposited by various methods including AC reactive magnetron sputtering, DC reactive magnetron sputtering, RF reactive magnetron sputtering, or sputtering from a composite or compound target such as stoichiometric TiN, Meta-Mode sputtering (proprietary process of Optical Coating Laboratories, Inc., Santa Rosa, Calif., U.S.A.), chemical vapor deposition or plasma-enhanced chemical vapor deposition, electron beam evaporation, thermal evaporation, spin-coating, or sol gel processing. In accord with the present invention, a preferred production method is sputter coating and, particularly, in-line DC reactive magnetron sputtering.

In-line DC reactive magnetron sputtering processes are useful with many, but not all, materials. The process consumes large quantities of energy and is relatively energy inefficient compared to other thin film deposition processes such as thermal or electron beam evaporation. Aside from energy consumption, the other major component of overall cost with this method is the coating material cost. Because of special preparation techniques or other attributes, the cost variance between target materials used to deposit commonly used compounds such as $SiO_2$, $TiO_2$, $Nb_2O_5$, various niobium oxynitrides or titanium oxynitrides, $SnO_2$, and $Al_2O_3$ is relatively small. The material costs become relatively excessive, however, when less common materials such as precious metals, rare earth metals, or high purity refractory metals are used. Thus, the major variance in production cost when the common materials are used is related to the energy efficiency of the process.

Within the industry, the energy used to produce thin film assemblies is commonly characterized as "rate." Persons of skill in the art use the term "high rate material" to refer to a material which yields a large quantity of thin film coating with expenditure of a correspondingly low amount of electrical energy. A means of characterizing the rate, or equivalently, the energy used in the deposition of a film or a film assembly, is known as the Dynamic Deposition Index ("DDI"). The DDI may also be referred to as the Dynamic Deposition Rate ("DDR"). A concise form for DDI is the following:

$$R = \frac{S \cdot d \cdot C}{n \cdot P}$$

where R is the DDI rate, S is the linespeed of the coating line (in units of mm/sec), d is the film thickness (in units of Å), C is the length of the coating source (in units of mm), n is the number of sources (no units), and P is the power per source (in units of Watts or Joules/sec). When the units in parentheses are used, the units of the resulting R are Å mm²/Joule. The reciprocal of R, having units of Joule/Å mm² can be understood to represent the amount of energy (in Joules) required to form a unit volume of thin film coating having a thickness of 1 Å and a length of 1 mm per side.

Each thin film coating material has at least one unique DDI rate associated with that material for deposition using an in-line reactive DC magnetron sputtering process. The DDI rate is not an intrinsic property of the material but rather is a process property. The DDI rate of a specific material can vary with parameters of the deposition system such as, for example, process gas mix and pressure and coating chamber geometry. The DDI rate is nevertheless valuable in that it is reasonably transferable from one in-line reactive DC magnetron sputter system to another.

For a single layer of thin film of known composition and thickness, a specific energy consumption value for production of that layer can be determined by dividing the thickness of the film layer by the DDI rate for that layer:

$$U = \frac{d}{R}$$

where U is the energy utilization efficiency for production of the layer and has units of Joules/mm².

For a multi-layer thin film assembly, the overall energy utilization efficiency is the sum of the utilization efficiencies of the individual layers:

$$U_i = \frac{d_i}{R_i}$$

and:

$$U_{total} = \sum_i U_i$$

An application of these concepts permits an overall figure of merit for an antireflection coating to be described which incorporates both the desired optical performance parameters, brightness and bandwidth ratio, and the energy utilization efficiency value. In particular, it is desired to produce an in-line reactive DC magnetron sputtered antireflection coating having as small a brightness value and as broad a bandwidth ratio as possible. It is further desired to produce coatings at the smallest possible production cost. Because production cost is directly related to energy consumption, it is desired to produce the most energy efficient coating possible. Thus, the figure of merit for comparison of different antireflection coatings is defined as:

$$M = \frac{(BWR)}{(BRT) \cdot U}$$

for a single layer coating and:

$$M = \frac{(BWR)}{(BRT) \cdot \sum_i U_i}$$

for a multi-layer coating, where M is the merit figure, BWR is the bandwidth ratio, BRT is the photopic brightness, and U is the energy utilization for each layer. The units of M are mm²/Joule indicating the performance-weighted area of coating which can be produced by each Joule of energy input into the in-line reactive DC magnetron sputter process.

In accord with the above description, merit figures for each of the prior art designs detailed in the background section have been calculated as follows:

For the two-layer transparent antireflection coating design comprising a first, outermost, layer of $SiO_2$ approximately 116 nm thick and a second, innermost, $Nb_2O_5$ layer approximately 18 nm thick, the brightness value is approximately 0.84% and the bandwidth ratio is about 1.16. The calculated merit function is 36.

For the two-layer transparent antireflection coating design comprising a first, lo outermost, layer of $SiO_2$ approximately 60 nm thick and a second, innermost, $Nb_2O_5$ layer approximately 96 nm thick, the brightness value is about 2.99% and the bandwidth ratio was about 1.10. The calculated merit function is 5.

For the three-layer antireflection coating design comprising a first layer of $SiO_2$ 86 nm thick, a second layer of $Nb_2O_5$ 100 nm thick, and a third layer of silicon oxynitride material 74 nm thick, the calculated brightness value was about 0.12% and the calculated bandwidth ratio was 1.64. The calculated merit function is 150.

For the four-layer antireflection coating design comprising an outermost, or first, layer of $SiO_2$ that is 92 nm thick, a next adjacent, or second, layer of $Nb_2O_5$ that is 112 nm thick, another next adjacent, or third, layer of $SiO_2$ that is 33 nm thick, and an innermost, or fourth, layer, adjacent to the substrate, of $Nb_2O_5$ that is 15 nm thick, the calculated brightness value was 0.16% and the calculated bandwidth ratio is 1.44. The calculated merit function is 86.

For the four-layer absorbing antireflection coating design comprising an outermost, or first, layer of $SiO_2$ that is about 82 nm thick, a next adjacent, or second, layer of TiN that is about 7 nm thick, another next adjacent, or third, layer of $TiO_2$ that is about 30 nm thick, and an innermost, or fourth, layer, adjacent to the substrate, of TiN that is about 20 nm thick, the calculated brightness value for this design was about 0.102% and the calculated bandwidth ratio was 1.60. The calculated merit function is 267.

A merit function calculation was performed for the center portion of each of the two-layer absorbing antireflection coating designs described in Examples 1 and 2.

The high performance, electrically conductive, contrast-enhancing antireflection coating in accord with the present invention of Example 1 comprised a glass substrate coated with an absorbing layer of titanium oxynitride about 12 nm thick and a transparent layer of $SiO_2$ about 92 nm. The stoichiometries of the titanium oxynitride in this example is estimated to be approximately Ti=1; N=1.0; and O=0.4. The bandwidth ratio is approximately 1.70 and the brightness value is 0.04%. Accordingly, the merit function calculation is 1797.

The coating of Example 2 comprised a glass substrate coated with an absorbing layer of titanium oxynitride about 12 nm thick and a transparent layer of $SiO_2$ about 92 nm thick. The approximate stoichiometries of the titanium oxynitride in this example is Ti=1; N=1.0; and O=0.4. The bandwidth ratio was approximately 1.7 and the brightness value for the center portion of the film was about 0.09%. Accordingly, the merit function calculation is 794.

At 1797 and 794, the merit functions for the high performance, electrically-conductive, absorbing, contrast-enhancing antireflection coatings in accord with the present invention are significantly greater than the merit functions for the other coatings which are either much more complex or of lower performance. The simple yet high performance coatings in accord with the present invention are, therefore, much more cost effective to produce.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An antireflective layer system for a substrate, consisting essentially of:
   an absorbing layer arranged on the substrate on a surface of said substrate toward an observer, said absorbing layer comprising at least one transition metal reacted with nitrogen and oxygen such that a transition metal oxynitride is formed, said absorbing layer having a thickness in the range of about 9 to about 15 nm; and
   a transparent layer having a thickness in the range of about 80 to about 94 nm arranged on said absorbing layer.

2. The layer system described in claim 1 wherein said substrate is glass.

3. The layer system described in claim 2 wherein said transition metal is selected from the group consisting of titanium, zirconium, hafnium, vanadium, tantalum, and niobium.

4. The layer system described in claim 3 wherein said transition metal is titanium.

5. The layer system described in claim 4 wherein said absorbing layer comprises $TiO_xN_y$ where x is in the range of about 0.3 to about 0.8 and y is in the range of about 0.8 to about 1.2.

6. The layer system described in claim 5 wherein said absorbing layer is about 12 nm thick.

7. The layer system described in claim 6 wherein said transparent layer is selected from the group consisting of $MgF_2$, $SiO_2$, compositions consisting of silicon and oxygen with fluorine, compositions consisting of silicon and oxygen with nitrogen, compositions consisting of silicon and oxygen with fluorine and nitrogen, PTFE, $Al_2O_3$, $Y_2O_3$, $CeF_3$, and $ThF_4$.

8. The layer system described in claim 7 wherein the transparent layer is $SiO_2$.

9. The layer system described in claim 8 wherein said $SiO_2$ layer is about 92 nm thick.

10. An antireflective layer system for a substrate, consisting essentially of:
    an absorbing layer arranged on the substrate on a surface of said substrate toward an observer, said absorbing layer comprising at least one transition metal combined with nitrogen and oxygen, said absorbing layer having a thickness in the range of about 9 to about 15 nm; and
    a transparent layer having a thickness in the range of about 80 to about 94 nm arranged on said absorbing layer;
    wherein the combination of said absorbing and said transparent layers attenuates the brightness of said substrate surface to a value less than or equal to 0.22%.

11. The layer system described in claim 10 wherein said substrate is glass.

12. The layer system described in claim 11 wherein said transition metal is selected from the group consisting of titanium and zirconium.

13. The layer system described in claim 12 wherein said transition metal is titanium.

14. The layer system described in claim 13 wherein said absorbing layer comprises $TiO_xN_y$ where x is in the range of about 0.3 to about 0.8 and y is in the range of about 0.8 to about 1.2.

15. The layer system described in claim 14 wherein said absorbing layer is about 12 nm thick.

16. The layer system described in claim 14 wherein said transparent layer is $SiO_2$.

17. The layer system described in claim 16 wherein said transparent layer has a thickness of about 92 nm.

18. An antireflective layer system for a glass substrate, consisting essentially of:

an absorbing layer arranged on the substrate on a surface of said substrate toward an observer, said absorbing layer comprising $TiO_xN_y$ where x is in the range of about 0.3 to about 0.8 and y is in the range of about 0.8 to about 1.2, said absorbing layer having a thickness in the range of about 9 to about 15 nm; and a transparent layer having a thickness in the range of about 80 to about 94 nm arranged on said absorbing layer, said transparent layer comprising $SiO_2$.

19. The layer system described in claim 18 wherein said absorbing layer is about 12 nm thick and said transparent layer is about 92 nm thick.

* * * * *